March 31, 1936.   A. SCHMIDT   2,035,765
AUTOGENOUS WELDING AND CUTTING MACHINE
Filed Oct. 28, 1933   3 Sheets-Sheet 1

Inventor:
Adam Schmidt
By Knight Bros.
his Attys.

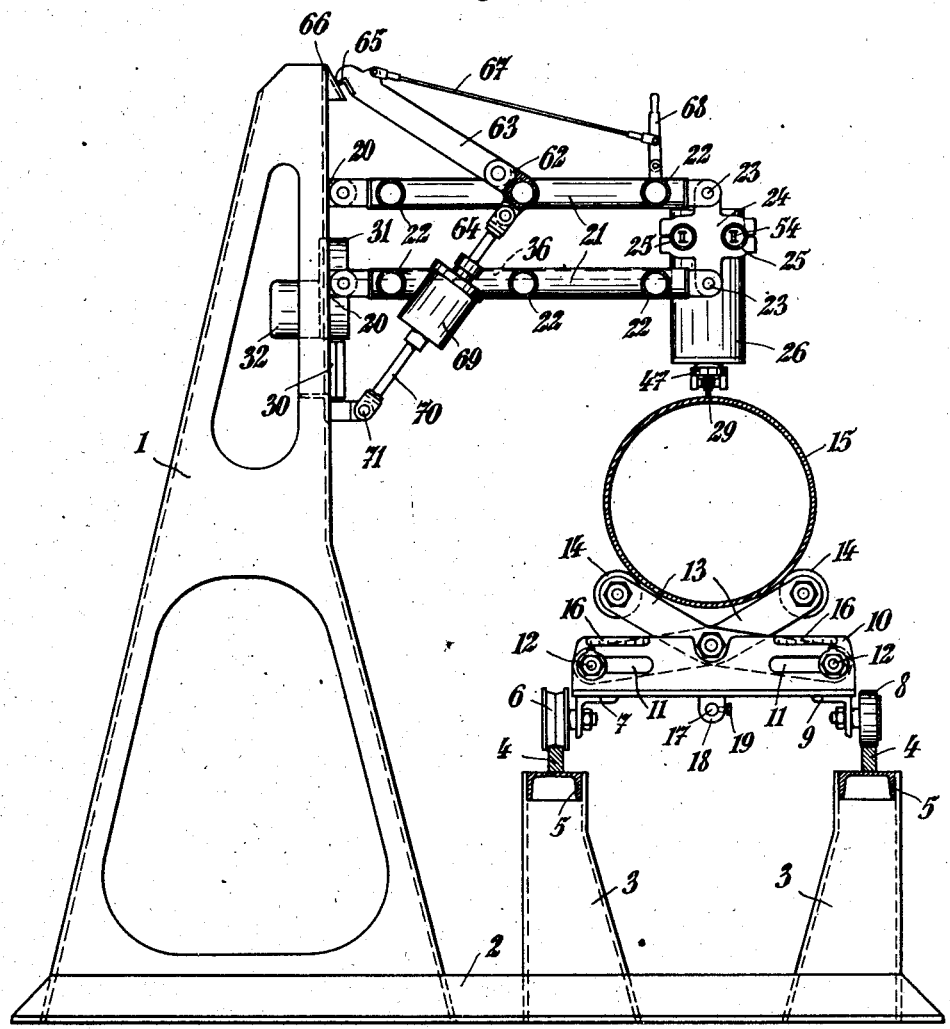

March 31, 1936.  A. SCHMIDT  2,035,765
AUTOGENOUS WELDING AND CUTTING MACHINE
Filed Oct. 28, 1933   3 Sheets-Sheet 3
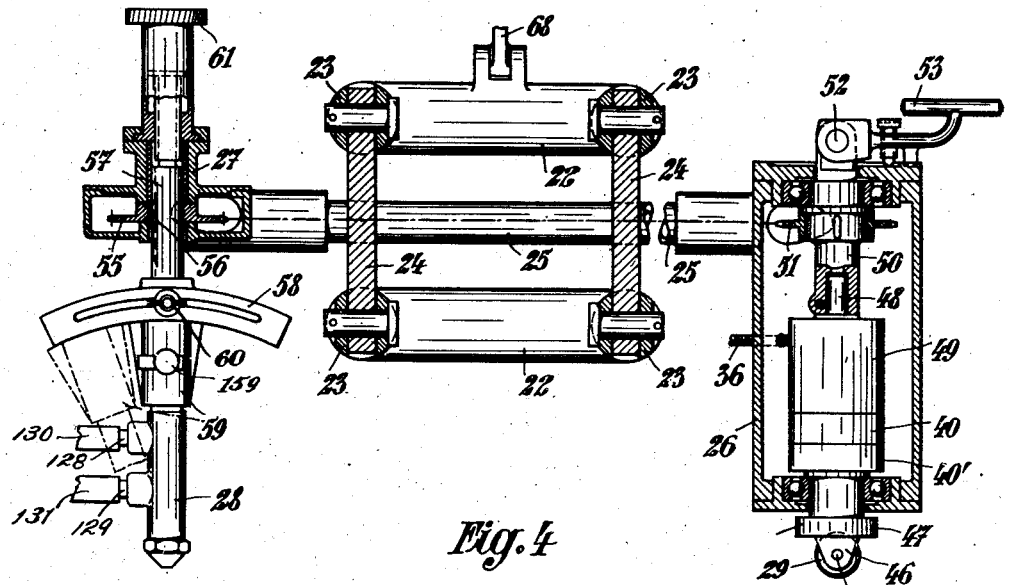
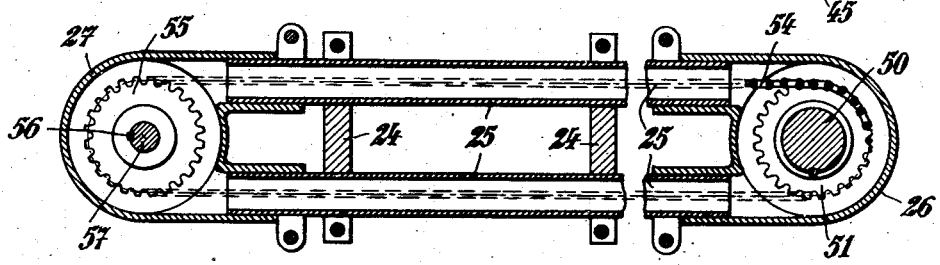
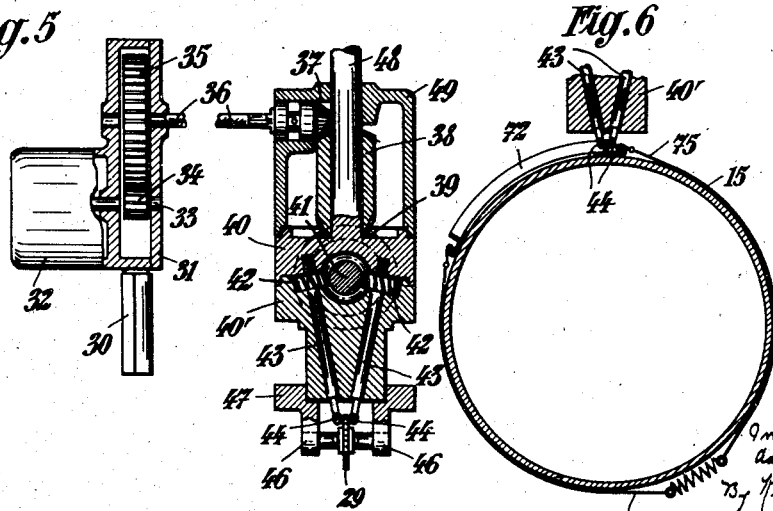

Patented Mar. 31, 1936

2,035,765

UNITED STATES PATENT OFFICE 2,035,765

AUTOGENOUS WELDING AND CUTTING MACHINE

Adam Schmidt, Vienna, Austria

Application October 28, 1933, Serial No. 695,892
In Austria October 31, 1932

16 Claims. (Cl. 266—23)

This invention relates to a new and improved autogenous welding and cutting machine for working on tubes, and makes use of the principle known in connection with autogenous welding and cutting machines of other types, by which the burner is controlled in its movement by the rolling of a driving wheel against the outer surface of a cylindrical body, as described in U. S. Patents Nos. 1,921,887 and 1,921,888. In these known machines, which are intended to serve, for example, for cutting plates, the driving wheel, which is pivoted about an axis at right angles to its axis of rotation, is mounted in a fixed casing, and the cylindrical body is connected with the carrier of the burner. The movement of the burner is controlled by virtue of the fact that the movement of the driving wheel on the outer surface of the rotatable and slidably mounted cylinder is resolvable into two components of which the component coinciding with the axis of the cylinder results in a longitudinal displacement of the cylinder, while the rotary movement of the cylinder is transmitted to a carriage on which the entire outfit is mounted. In another form of construction of such machines the cylinder is merely rotatably but not slidably mounted, and the casing of the driving wheel connected to the burner holder or carrier. In this case the above-mentioned component is transmitted directly to the burner, and the rotary movement, as before, to the carriage.

In accordance with the present invention, as distinct from both the above-mentioned types of construction, both the burner and the driving wheel are fixedly mounted, and the place of the cylinder is taken by the workpiece (tube) itself which is independently rotatable on a carriage. With this arrangement, if the driving wheel be caused to rotate, through the intermediary of a gearing head, and guided by hand to follow the lines of a drawing it will travel over the surface of the tube and at the same time impart to the latter an axial, rotary, or combined movement, according to its own movement. The tube is thus caused to carry out, relatively to the fixed burner, a movement the contour of which corresponds to the drawing of the cut to be made. In place of a drawing there can be attached to the tube a templet which is grasped and followed, for the controlling of the machine, by a pair of rollers replacing the driving wheel. In this latter case the controlling is effected mechanically and positively, so that guiding by hand is dispensed with.

The invention further relates to certain details of the construction of the machine.

A form of construction embodying the invention is shown, by way of example, in the accompanying drawings, in which:—

Fig. 2 is a side elevation of the entire machine, in part section.

Fig. 3 shows a gearing head and burner together with their positively acting interconnecting mechanism, in longitudinal section.

Fig. 4 shows the same in transverse section.

Fig. 5 is a longitudinal section of a portion of the gearing head.

Fig. 6 shows a templet with standing rib of the type used in connection with the machine according to the invention, and the manner of attaching the same to the workpiece.

Figure 1:
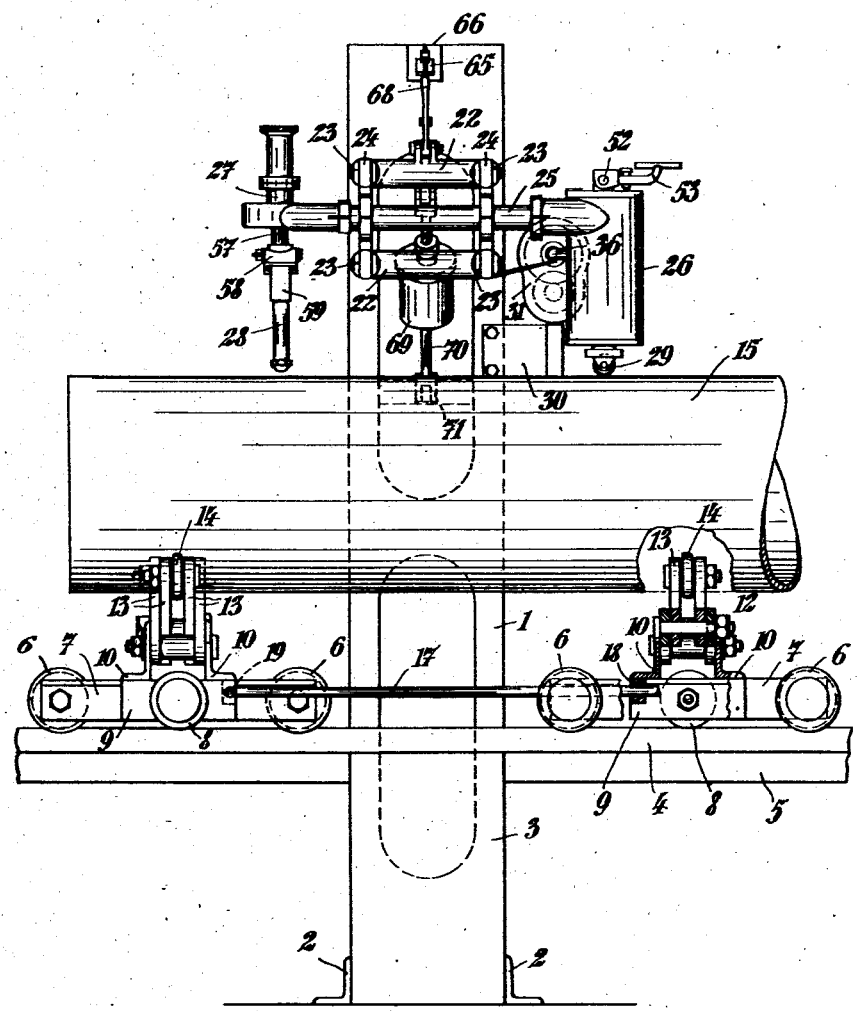
Fig. 1 is a front elevation of the entire machine, in part section.

Referring to the drawings, the upright framework 1 is connected by means of angle irons 2 to standards 3 to which there are attached U-girders 5 carrying rails 4 and supported on pairs of such standards of which only the end pair can be seen in elevation in Fig. 2. On the said rails there travels a carriage consisting of a plurality of parts of which two are shown in Fig. 1. Each part of the carriage runs on three wheels mounted in off-set relation. The wheels 6 are disposed one behind the other and are mounted on an angle iron 7. The third wheel 8 is mounted on an angle iron 9 connected to the member 7 by means of two transverse angle irons 10. In slots 11 in the angle irons 10 there are guided and adjustably fixable, by means of bolts 12, the lower ends of two pairs of crossed arms 13 arranged parallel to each other. The upper ends of the arms 13 are provided with rollers 14 forming a cradle on which the tube 15 to be cut can be rotatably supported at a plurality of points. The adjustment of the crossed arms to suit the diameter of the tube is facilitated by the provision of graduation marks 16 above the slots 11. Since the rollers of the cradle are higher the nearer they are brought together, workpieces of smaller diameter will be supported at a higher level than large workpieces, so that whatever the size of the tube being worked, the uppermost portion thereof will always be at approximately the same level, and the cutting burner in enabled to work constantly at one level. The individual parts of the carriage are capable of being coupled together by means of rods 17 which are passed through eyes 18 in the angle irons 10, and retained in position by set-screws 19. The wheels 6 on the several parts of the carriage are arranged alternately on the two rails 4; that is to say, the wheels 8 of one carriage part run on one rail and the wheels 8 of the next carriage part run on the opposite rail. These wheels are flanged on both sides, so that the entire carriage is guided reliably and without jamming or cross-binding, even if the spacing of the rails be not particularly accurate. The mounting of each part of the carriage on three wheels ensures bearing upon all the wheels.

On the upright framework 1 there are two pairs of bearings 20 for the articulate attachment of tubes 21 each pair of which is interconnected by means of tubes 22 to form a frame. The forward ends of the tubes 21 are provided with drilled lugs 23 for the attachment of bridging or connecting pieces 24 between the frames, one on each side. Through apertures in these connecting pieces there are passed tubes 25 which project on both sides, and which carry on the one side the casing 26 of the gearing head, and on the other side the holder 27 of the burner 28. The casing 26 bears with the driving or tracking wheel 29 upon the tube 15 to be cut. On the upright framework 1 there is provided a bearing plate 30 for the housing 31 of transmission gearing which can be driven by a motor 32. To the shaft 33 (Fig. 5) driven by this motor there is secured a toothed wheel 34 which meshes with a toothed wheel 35 connected to a flexible shaft 36. The shaft 36 is attached by its other end to a bevel wheel 37 which engages a toothed sleeve 38 which in its turn meshes with a bevel wheel 39. This bevel wheel 39 is mounted in a two-part casing 40, 40', and is attached to a spiral gear 41 engaged by two spiral gears 42 mounted on converging shafts 43. To the lower ends of the shafts 43 there are attached milled rollers 44 which embrace the driving wheel 29, and are capable of rotating the same. The axle pin 45 of this driving or tracking wheel is mounted in dependent wing-shaped portions 46 of an annular member 47. This member 47 is retained in position by the mere insertion of the driving or tracking wheel between the rollers 44. The casing portion 40 is provided with a pin 48 on which the sleeve 38 is mounted, and on which there is fitted a portion 49 of the casing which encloses the parts 37 and 38.

The casing portion 40' rests, with the interposition of a ball bearing, upon the bottom of the casing 26, and projects therethrough. To the pin 48 there is attached a shaft 50 which carries a chain sprocket wheel 51, and which is mounted in a ball bearing in the casing 26. At the upper end of this shaft there is provided a handle 53 pivotally mounted by means of a bolt 52, by means of which the pin 48 together with the casing 40, 40' and the driving or tracking wheel 29 can be tilted.

The chain 54 traveling over the sprocket wheel 51 is taken through the tube 25 to a sprocket wheel 55 which is longitudinally slidable but locked against rotation (key 56) on the spindle 57 of the burner. An arc piece 58 is rigidly connected to the spindle 57. The arc piece has an arc-shaped guide slot disposed in a vertical plane, in which slot the burner holder 59 is slidably mounted. By means of a wing nut 60 the burner holder 59 can be fixed in any desired angular position. The burner 28 is rotatably mounted in the holder 59 and is held therein by means of a spring bolt 159 engaging in an annular groove (not shown) in the burner 28. The burner has two laterally projecting nipples 128 and 129 for the connection of tubes 130 and 131 to supply the combustible gas and oxygen, respectively. This means of gas supply is shown, for example, in my prior patent, 1,921,888. A hand-wheel 61 is provided in a known manner for the adjustment of the height of the burner.

To one of the tubes 22 there is attached an angle piece 62 to the ends of which there are articulated an arm 63 and a connecting rod 64. The arm 63 can be hooked up by means of a notch 65 to the upper edge 66 of the upright framework 1, by which means the parallelogram of links together with the entire guiding mechanism can be retained in the lifted position. Coupled to the free end of the arm 63 there is a tension rod 67 which is pivoted to a handle 68 mounted on the parallelogram of links. The connecting rod 64 is attached to a piston adapted to travel in a casing 69 which is pivotally attached at 71 to the stand 1 of the machine, by means of a rod 70.

When the part 47 with the driving wheel 29 is detached, the milled rollers 44 can be used in a known manner for controlling the machine by templet (see Fig. 6) provisionally attached to the tube 15 to be cut. The securing of the templet 72 in position can be effected by means of steel straps 75 hooked into the base flanges of the templet.

After the tube to be cut has been placed in position on the rollers 14 of the carriage, the lever 63 is unlatched by a pull on the handle 68, with the result that the parallelogram of links together with the guide mechanism descends of its own weight, but braked by the action of the damping device 69, until the driving wheel 29 comes to rest upon the drawing spread out or traced on the surface of the tube. After the switching on of the motor 32, the flexible shaft 36 is rotated, through the intermediary of the reduction gearing, and with it the driving wheel 29, through the train 37, 38, 39, 41, 42, 44. The driving wheel is caused to follow accurately the outline of the drawing, by suitable operation of the handle 53. By this rolling of the driving wheel against the surface of the tube, the latter, as explained at the outset, is caused to carry out a resultant movement relatively to the burner corresponding to the outline of the drawing, so that the required cut is produced.

If it is desired that the cut be inclined and not at right angles to the surface of the workpiece, the burner holder 59 is tilted to the desired angle in the arcuate guide 58, and then fixed in position by means of the nut 60. The tilting or swivelling movement of the driving wheel is transmitted, through the chain drive 51, 54, 55, to the spindle 57 and burner holder 59, so that the angle of the burner to the surface of the tube remains constant.

When templets are employed there is no need for controlling the movement of the driving wheel by means of the handle 53, since the rollers 44, by grasping the upstanding flange of the templet, effect automatically the guiding of the tube, for the production of the required movement to obtain a cut corresponding exactly to the pattern of the templet, as will be clear from the drawings.

I claim:

1. An autogenous welding and cutting machine for working on tubes, comprising a burner holder, a burner carried thereby; means to support the tube for free axial and rotary motion in proximity to said burner; and means for imparting combined axial and rotary movements to the tube, comprising a gear head connected to said burner holder and having driving connection with the tube.

2. A machine as described in claim 1, wherein said gear head comprises a swivelling, positively driven roller adapted to engage the surface of the tube.

3. A machine as described in claim 1, wherein said gear head comprises a swivelling positively driven pair of rollers adapted to embrace a templet on the tube.

4. A machine as described in claim 1, wherein said gear head comprises a swivelling positively driven pair of rollers and a third detachable roller embraced and driven by said pair of rollers and adapted to engage the surface of the tube.

5. In an autogenous welding and cutting machine for working on tubes; means to support the tube for free axial and rotary motion; a burner holder, a gear head, a common support on which said burner holder and gear head are mounted in proximity to the tube; said gear head comprising a positively driven, swivelling, driving device, and a handle to turn the latter on its swivel to any desired angular position with respect to the axis of the tube; said driving device being adapted to impart combined axial and rotary movements to said tube under the control of said handle.

6. A machine as described in claim 5, wherein said common support is positioned above the tube and is vertically movable to and from operative position.

7. In an autogenous welding and cutting machine for working on tubes; means to support the tube for free axial and rotary motion; a support adjacent the tube; a burner holder mounted on said support so as to swivel about an axis substantially perpendicular to the axis of the tube, said burner holder being inclinable about an axis transverse to its axis of swivelling; a gear head swivelly mounted on said support and comprising driving means to impart combined axial and rotary motions to the tube; and means interconnecting said gear head and burner holder to cause them to swivel in unison.

8. A machine as described in claim 7, wherein said means interconnecting said gear head and burner holder comprise a chain and sprockets, the two sides of said chain being inclosed in pipes forming a part of said support.

9. A machine as described in claim 8, wherein said means interconnecting said gear head and burner holder comprise a chain and sprockets, the two sides of said chain being inclosed in pipes forming a part of said support, said burner holder and gear head being adjustably mounted on said pipes for regulating said chain.

10. In a machine for autogenous cutting and welding of tubes, means to support the tube for free longitudinal and rotary motion, comprising a carriage consisting of a plurality of parts coupled together and a track upon which said carriage travels, each of said parts having a set of three wheels arranged two on one track and one on the other; a support above the tube, and a burner holder and a gear head mounted on said support; said gear head comprising means to impart longitudinal and rotary motions to the tube.

11. A machine as described in claim 10, wherein the parts of said carriage are coupled together in such a way that the two wheels of each part arranged one behind the other are supported alternately on the two rails, so that a carriage having said two wheels running on one rail is followed by a carriage having said two wheels running on the other rail.

12. In a machine for autogenous welding and cutting of tubes, a carriage, a pair of crossed arms pivoted together between their ends and having their lower ends adjustably secured in transverse slots in said carriage, rollers on the upper ends of said arms for rotatably supporting the tube, and a burner holder and gear head mounted in opposed relation to said crossed arms, said gear head comprising means for imparting axial and rotary motions to the tube.

13. In a machine for autogenous welding and cutting of tubes, means to support the tube for free axial and rotary motion, a burner holder, a gear head, a common support comprising a parallelogram of links on which said burner holder and gear head are mounted, a stationary frame to which said common support is connected by two joints, the arrangement being such that said burner holder and gear head can be made to approach and recede from the tube by the motion of said common support, said gear head comprising means for imparting axial and rotary motions to the tube.

14. A machine as described in claim 13, in combination with a damping device controlling the approaching and receding motions of said common support.

15. A machine as described in claim 13, in combination with a hook device to hold said common support in retracted position.

16. In a machine for autogenous welding and cutting of tubes, means to support the tube for free axial and rotary motion, a burner holder, a gear head comprising means for imparting axial and rotary motions to the tube, a common support for said burner holder and gear head comprising a stationary frame and parallel links articulated thereto, said burner holder and gear head being articulately mounted upon the outer ends of said links so as to be held in a fixed angular relation to said frame as they swing toward and away from the tube.

ADAM SCHMIDT.

CERTIFICATE OF CORRECTION.

Patent No. 2,035,765.  March 31, 1936.

ADAM SCHMIDT.

It is hereby certified that error appears in the printed specification of the above numbered patent requiring correction as follows: Page 3, first column, line 53, claim 9, for the reference numeral "8" read 7; and that the said Letters Patent should be read with this correction therein that the same may conform to the record of the case in the Patent Office.

Signed and sealed this 5th day of May, A. D. 1936.

Leslie Frazer (Seal)  Acting Commissioner of Patents.